United States Patent
Wood

(10) Patent No.: US 10,992,994 B2
(45) Date of Patent: Apr. 27, 2021

(54) AGGREGATING MEDIA CONTENT IN NON-TEMPORAL FORMAT

(71) Applicant: Roku, Inc., Los Gatos, CA (US)

(72) Inventor: Anthony Wood, Palo Alto, CA (US)

(73) Assignee: Roku, Inc., Los Gatos, CA (US)

(*) Notice: Subject to any disclaimer, the term of this patent is extended or adjusted under 35 U.S.C. 154(b) by 0 days.

(21) Appl. No.: 15/784,900

(22) Filed: Oct. 16, 2017

(65) Prior Publication Data

US 2018/0041813 A1    Feb. 8, 2018

Related U.S. Application Data

(63) Continuation of application No. 13/082,256, filed on Apr. 7, 2011, now Pat. No. 9,807,462.

(51) Int. Cl.
*H04N 21/482* (2011.01)
*H04N 21/25* (2011.01)
*H04N 21/458* (2011.01)

(52) U.S. Cl.
CPC ......... *H04N 21/482* (2013.01); *H04N 21/251* (2013.01); *H04N 21/458* (2013.01)

(58) Field of Classification Search
CPC ... H04N 21/482; H04N 21/251; H04N 21/458
See application file for complete search history.

(56) References Cited

U.S. PATENT DOCUMENTS

| 6,782,550 B1* | 8/2004 | Cao .................... H04N 5/44543 |
| | | 348/E5.105 |
| 8,230,360 B2* | 7/2012 | Ma ........................ G06F 3/0482 |
| | | 715/788 |
| 8,250,614 B1* | 8/2012 | Ellis .................... H04N 21/4334 |
| | | 725/100 |

* cited by examiner

*Primary Examiner* — Nathan J Flynn
*Assistant Examiner* — Christine A Kurien
(74) *Attorney, Agent, or Firm* — Sterne, Kessler, Goldstein & Fox P.L.L.C.

(57) ABSTRACT

A video content source includes a processor and a media module executed by the processor. The media module identifies available on-demand media content, organizes on-demand media content by provider and associates on-demand media content by category. Aggregated on-demand media content is formed in a non-temporal grid organized by provider and category. The non-temporal grid may include various combinations of providers, categories and on-demand media content instances.

24 Claims, 8 Drawing Sheets

AGGREGATING MEDIA CONTENT IN NON-TEMPORAL FORMAT

CROSS REFERENCE TO RELATED APPLICATIONS

This application claims the benefit of U.S. application Ser. No. 13/082,256, filed on Apr. 7, 2011, titled "APPARATUS AND METHOD FOR AGGREGATING MEDIA CONTENT," which is hereby incorporated herein by reference in its entirety.

FIELD OF THE INVENTION

This invention relates generally to on-demand media content. More particularly, this invention relates to techniques for aggregating and presenting on-demand media content.

BACKGROUND OF THE INVENTION

Consumers have continuously increasing choices for on-demand media content. Available media content includes visual content (e.g., movie channels, television channels), audio content (e.g., radio), and miscellaneous media content, such as games and photographs.

Electronic programming guides are known in the art. These guides typically organize television shows in a grid with a time axis and a provider (i.e., channel or station) axis. Such an approach does not translate to on-demand content since the content is not bound to a particular time on the time axis. Accordingly, it would be desirable to provide new techniques for aggregating and presenting media content.

SUMMARY OF THE INVENTION

A video content source includes a processor and a media module executed by the processor. The media module identifies available on-demand media content, organizes on-demand media content by provider and associates on-demand media content by category. Aggregated on-demand media content is formed in a non-temporal grid organized by provider and category. The non-temporal grid may include various combinations of providers, categories and on-demand media content instances.

Some embodiments relate to a content processor, computer-implemented method, and media device that are configured to receive a first display parameter and a second display parameter. The first display parameter may specify a first non-temporal format for displaying first aggregated on-demand media content associated with a first provider and organized based on the first provider and a first criteria. The second display parameter may specify a second non-temporal format for displaying second aggregated on-demand media content associated with a second provider and organized based on the second provider and a second criteria, wherein the first criteria is different from the second criteria. The first and second aggregated on-demand media content may be organized into the first non-temporal format based in part on the first display parameter and the second non-temporal format based in part on the second display parameter, respectively. An interface comprising the organized first and second aggregated on-demand media content may then be provided.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
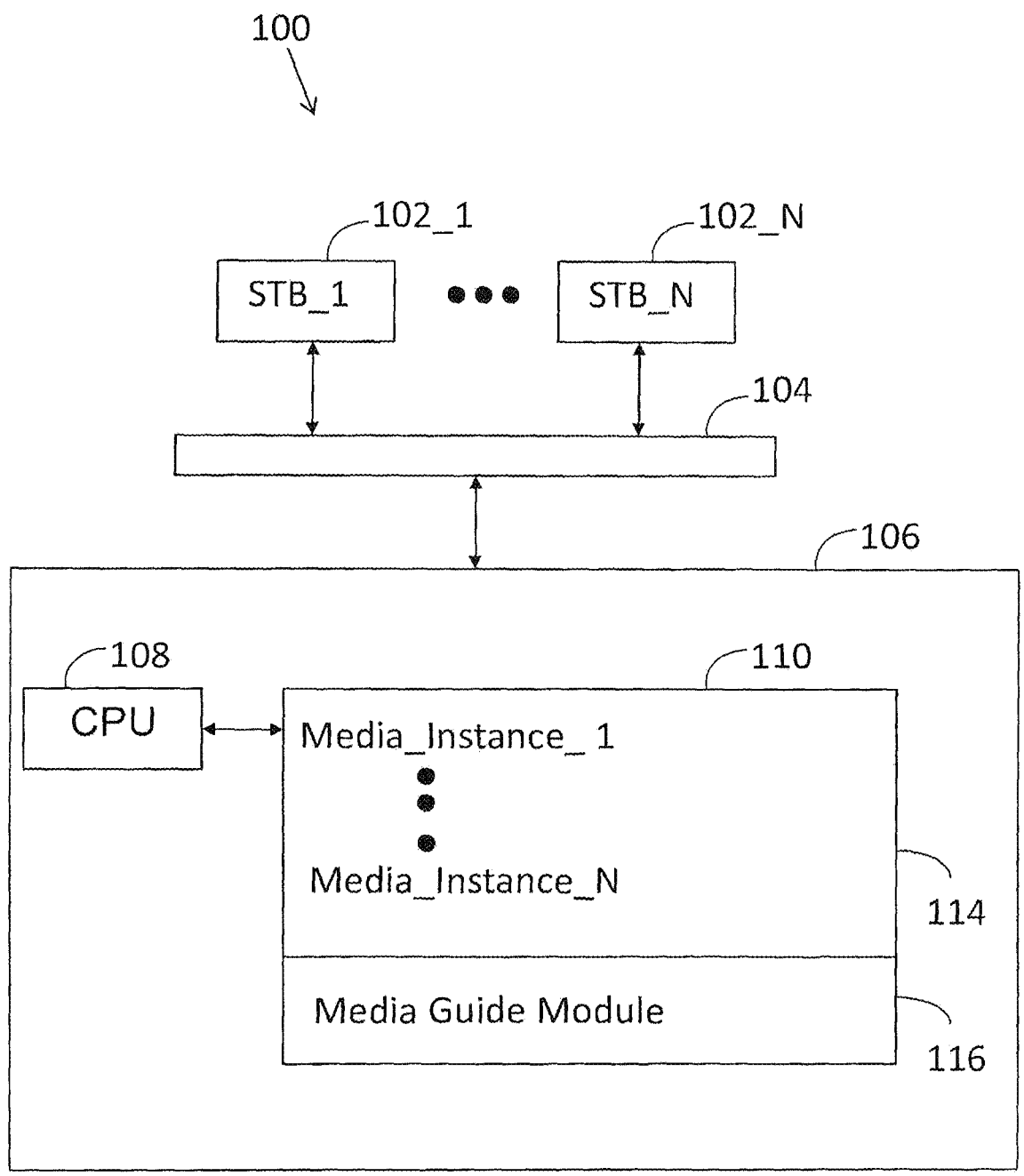
FIG. 1 illustrates a system configured in accordance with an embodiment of the invention.

FIG. 1 illustrates a system 100 configured in accordance with an embodiment of the invention. The system 100 includes a set of set-top boxes 102_1 through 102_N. As known in the art, a set-top box is a device that connects to a display (e.g., a television) and an external signal (e.g., a cable, satellite, wired or wireless IP network). The set-top box processes the external signal and presents its content on the display. The set-top box may be a discrete device or it may be incorporated into a television or other device.

FIG. 1 also illustrates a communication channel 104, which may be any wired or wireless communication channel. For example, the communication channel 104 may be a cable system, a satellite system or the internet.

A video content processor 106 is also connected to the communication channel 104. The video content processor 106 includes standard electronic components, such as a central processing unit 108 and a memory 110 storing media content and executable instructions to implement operations of the invention. In particular, the memory 110 stores a set of on-demand media content instances 114. The on-demand media content instances may include visual content (e.g., movie channels, television channels), audio content (e.g., radio), and/or miscellaneous media content, such as games and photographs. The media guide module 116 includes executable instructions to form aggregated on-demand media content in a non-temporal grid organized by provider and category, as discussed below.

The media content instances 114 need not be on the same machine as the media guide module 116. In other words, FIG. 1 is a simplified system in which the media guide module 116 and the media instances 114 are resident on the same machine. But it should be appreciated that multiple machines may be involved, such that the media guide module 116 is on a first machine and the media instances 114 are on a second machine or any number of additional machines.

Figure 2:
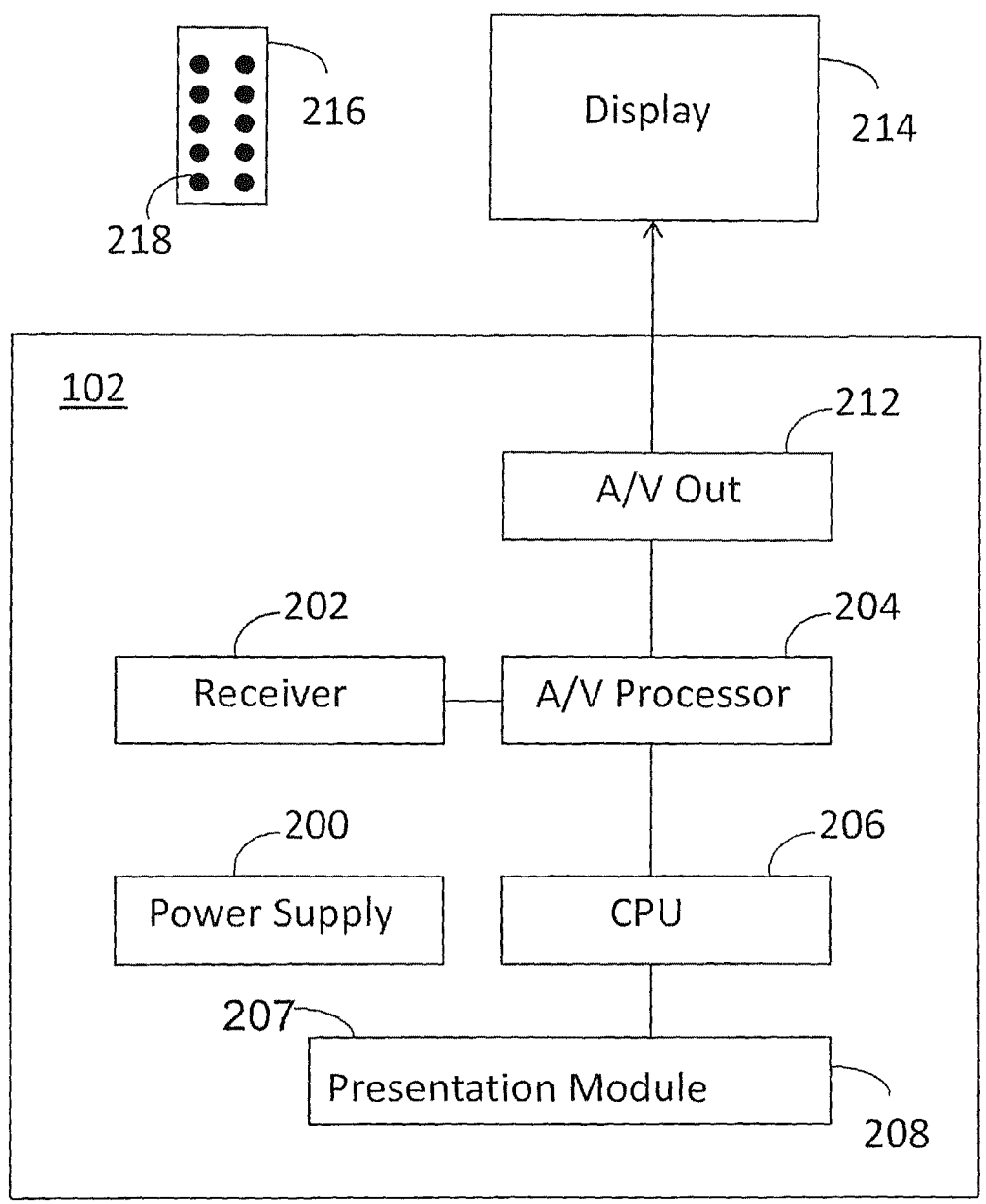
FIG. 2 illustrates a set-top box utilized in accordance with an embodiment of the invention.

FIG. 2 illustrates a set-top box 102 configured in accordance with an embodiment of the invention. The set-top box 102 includes standard components, such as a power supply 200 and a receiver 202, which may be configured for wired and/or wireless video signal reception. An audio/video processor 204 processes signals received by the receiver 202 and generates corresponding video content that is applied to audio/video output ports 212 for presentation on a display 214. The audio/video processor 204 operates in conjunction with a central processing unit 206, which accesses memory 207. Memory 207 stores executable instructions to implement operations of the invention. In one embodiment, the memory 207 stores a presentation module 208 to coordinate the display of the non-temporal grid received from the video content processor 106

The set-top box 102 is operative in connection with a remote control 216. In one embodiment, the remote control 216 includes a button 218 to initiate a customization of the non-temporal grid. Alternately, pull-down menus associated with the display may be used to specify custom parameters for the non-temporal grid.

Figure 3:
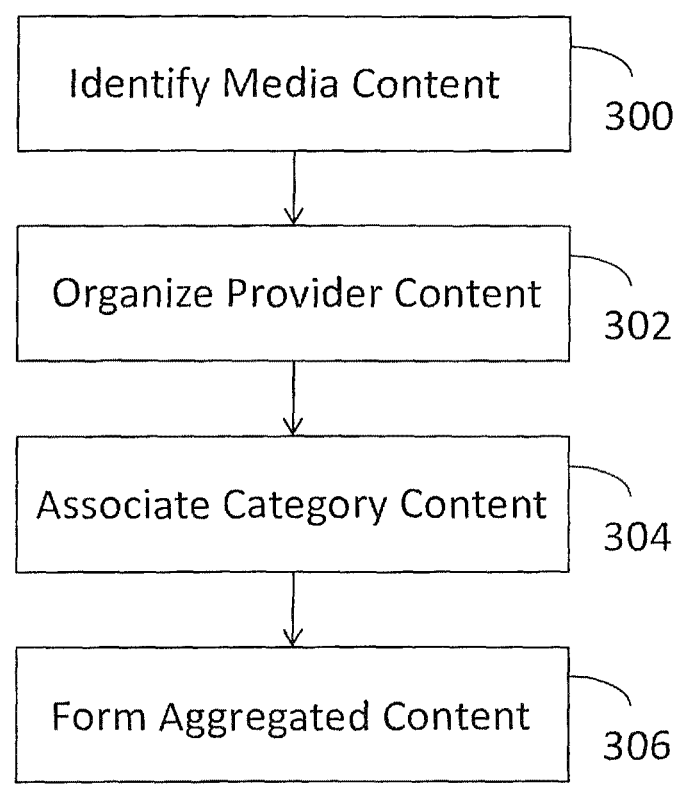
FIG. 3 illustrates media aggregation operations performed in accordance with an embodiment of the invention.

FIG. 3 illustrates processing operations associated with an embodiment of the media guide module 116. Available on-demand media content is initially identified 300. On-demand media content is then organized by providers 302. This results in a set of on-demand media content instances for each provider processed by the system. The on-demand media content is then associated by category 304. That is, categories, such as action, adventure, classics, documentaries may be associated with the on-demand media content instances. Aggregated content is then formed 306. The aggregated content is in the form of a non-temporal grid organized by provider and category, as illustrated below.

Figure 4:
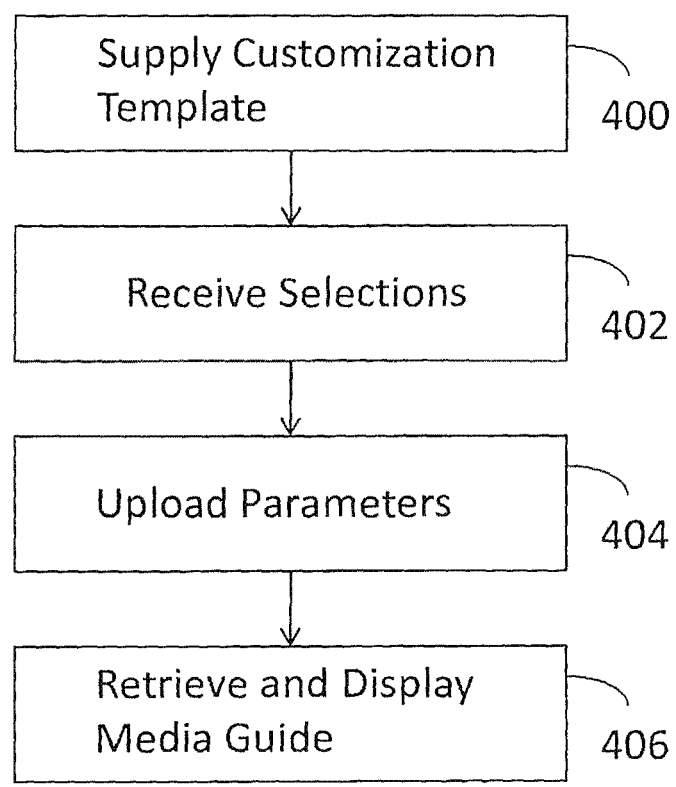
FIG. 4 illustrates set-top box operations performed in accordance with an embodiment of the invention.
Figure 5:
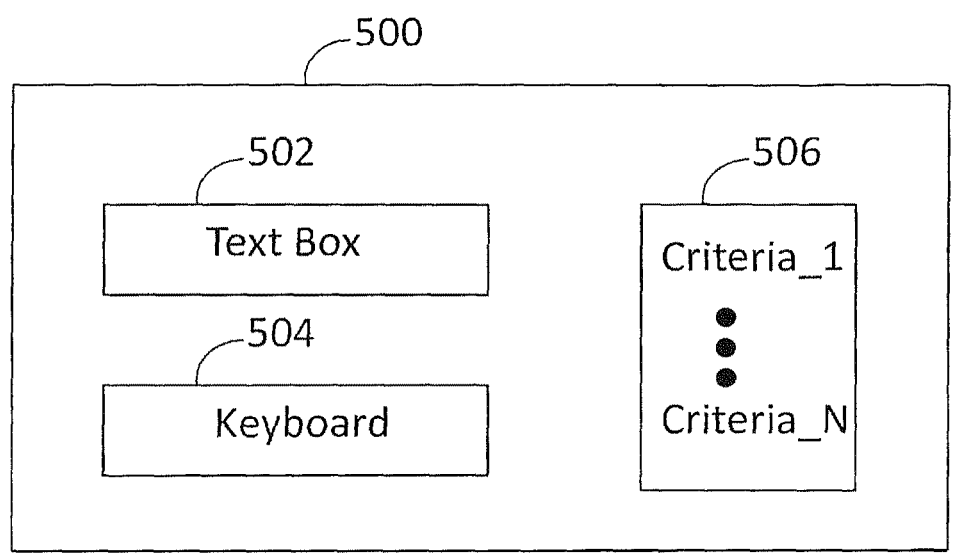
FIG. 5 illustrates a customization template that may be used in accordance with an embodiment of the invention.

FIG. 4 illustrates processing operations associated with a presentation module 208 of a set-top box 102. Initially, a customization template is supplied 400. This may be done in response to activation of a button 218 on remote 216. FIG. 5 illustrates an example of a customization template 500 that may be presented on display 214. The customization template 500 includes a set of selectable criteria 506. Each criteria may be selected using scrolling and selection controls of the remote 216. By way of example, an individual criteria may specify a non-temporal grid listing a provider and a set of content categories supplied by the provider. Alternately, the individual criteria may specify a provider and a set of on-demand media content instances organized alphabetically. If pre-existing criteria 506 is not sufficient, the presentation module 208 may be configured to accept user-defined customization parameters, as entered through a displayed keyboard 504 and presented in a text box 502.

Returning to FIG. 4, customization selections are received 402. The selections or parameters are then uploaded to the video content processor 106. This allows the media guide module 116 of the video content processor 106 to form the non-temporal grid in accordance with customization parameters. Alternately, the non-temporal grid may be formed in accordance with default parameters. The final operation of FIG. 4 is to retrieve and display a media guide 406 in the form of a non-temporal grid organized by provider and category. The operations of FIG. 4 may be repeated to present aggregated content in different formats. In other words, a user may dynamically view different forms of aggregated content.

Figure 6:
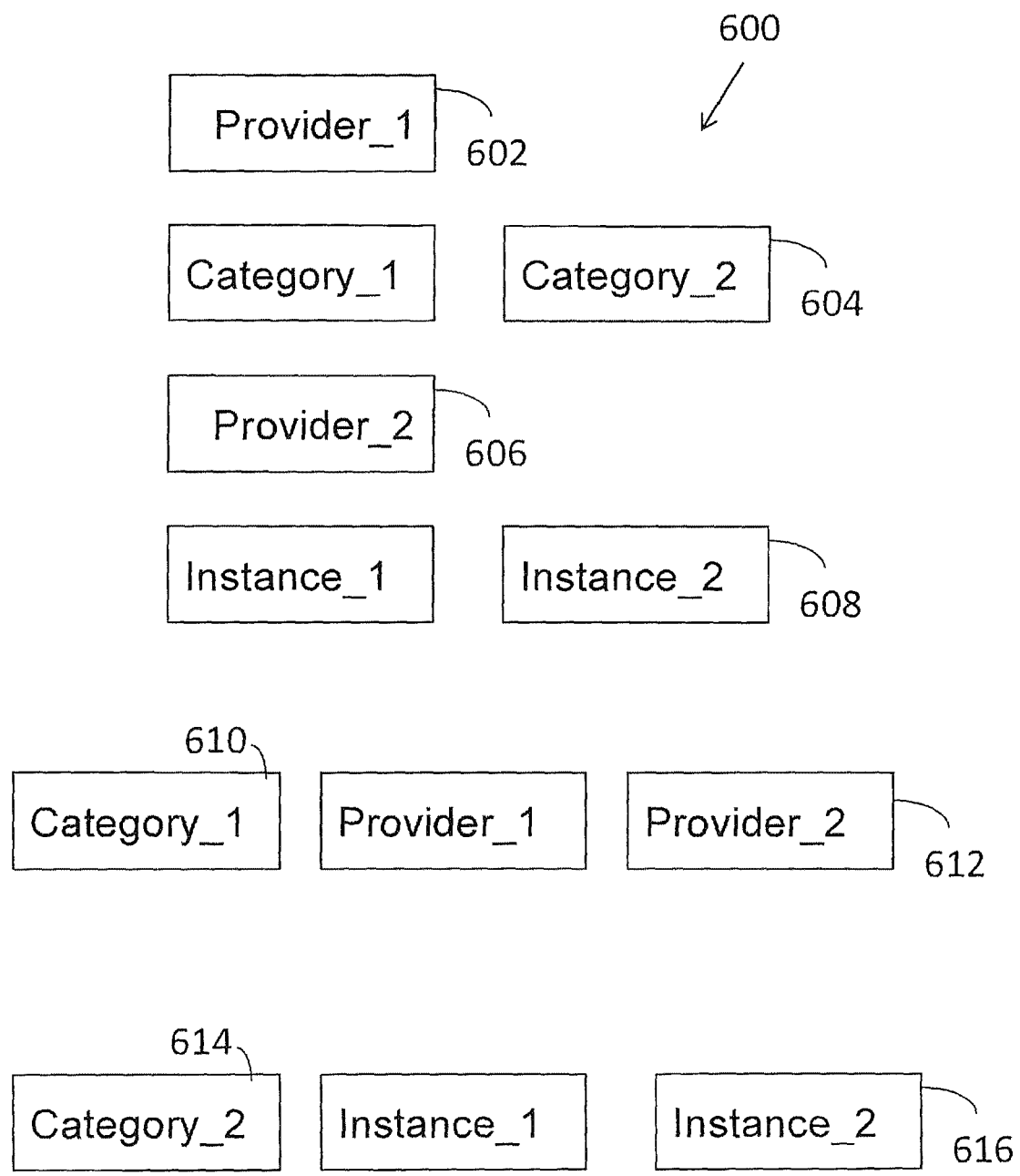
FIG. 6 illustrates aggregated content presented in accordance with an embodiment of the invention.

FIG. 6 provides an example of aggregated on-demand media content in a non-temporal grid organized by provider and category 600. A first row of the grid 600 specifies a provider. Associated with the provider is a set of categories, as shown in row 604. The same grid 600 includes a second provider 606. For this provider, content is displayed as a set of on-demand media content instances 608.

Observe then that the grid 600 lists multiple providers. Different providers may display associated content by category or as on-demand media content instances organized by some criteria (e.g., alphabetically, most viewed, most recently available, etc.).

The grid 600 may also organize media content by category, as shown with block 610. For a given category, various providers may be listed with content in the given category, as shown with row 612. In this example, the category 610 is in row 612, instead of above the row, as is the case with provider 602 and row 604. The grid 600 also illustrates a second category 614. For this category, media content is organized as a set of instance 616.

Figure 7:
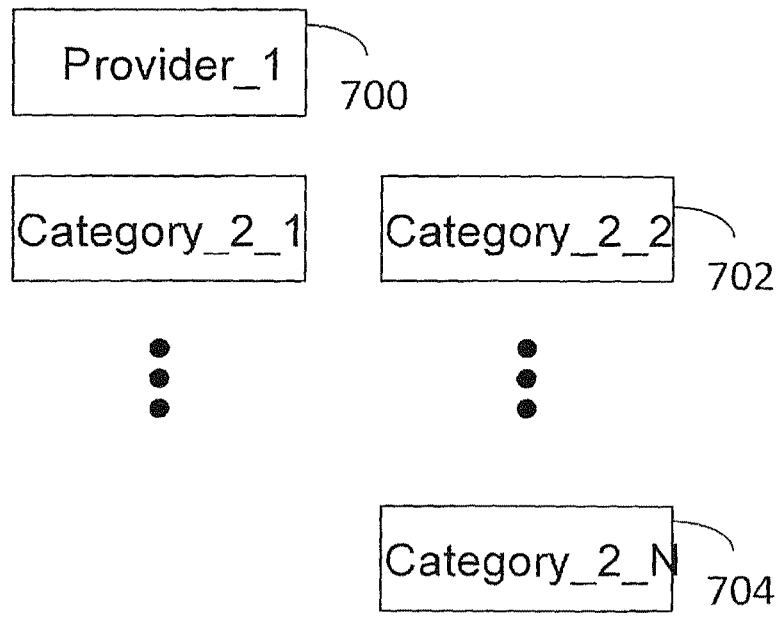
FIG. 7 illustrates aggregated content presented in accordance with an alternate embodiment of the invention.

A user may navigate the grid 600 using remote 216. Selection of a category may result in the listing of additional information. For example, selecting block 604 may result in a new grid of the type shown in FIG. 7. This figure illustrates a set of common media content category instances (Category_2_1 through Category_2_N) offered by a provider (Provider 1). For example, the common media content category instances may be a list of documentaries offered by a single provider.

Figure 8:
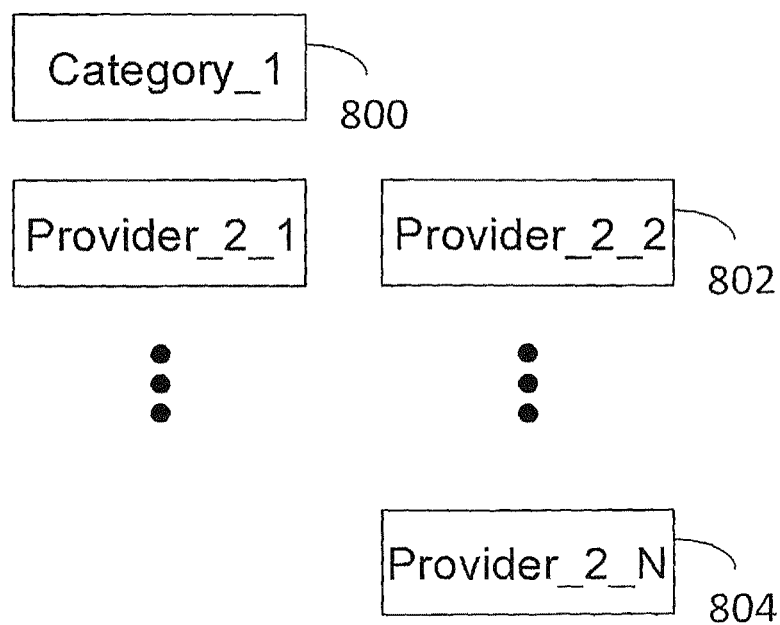
FIG. 8 illustrates aggregated content presented in accordance with an alternate embodiment of the invention.

Alternately, a user might select block 610 of grid 600. This would result in the grid shown in FIG. 8. FIG. 8 illustrates a set of on-demand media content instances offered by a single provider for the content category. The category is listed with block 800. Blocks 802 and 804 are examples of on-demand media content instances. Block 802 specifies the 2 instance for the second provider (Provider_2_2), while block 804 specifies the Nth instance for the second provider (Provider_2_N).

Figure 9:
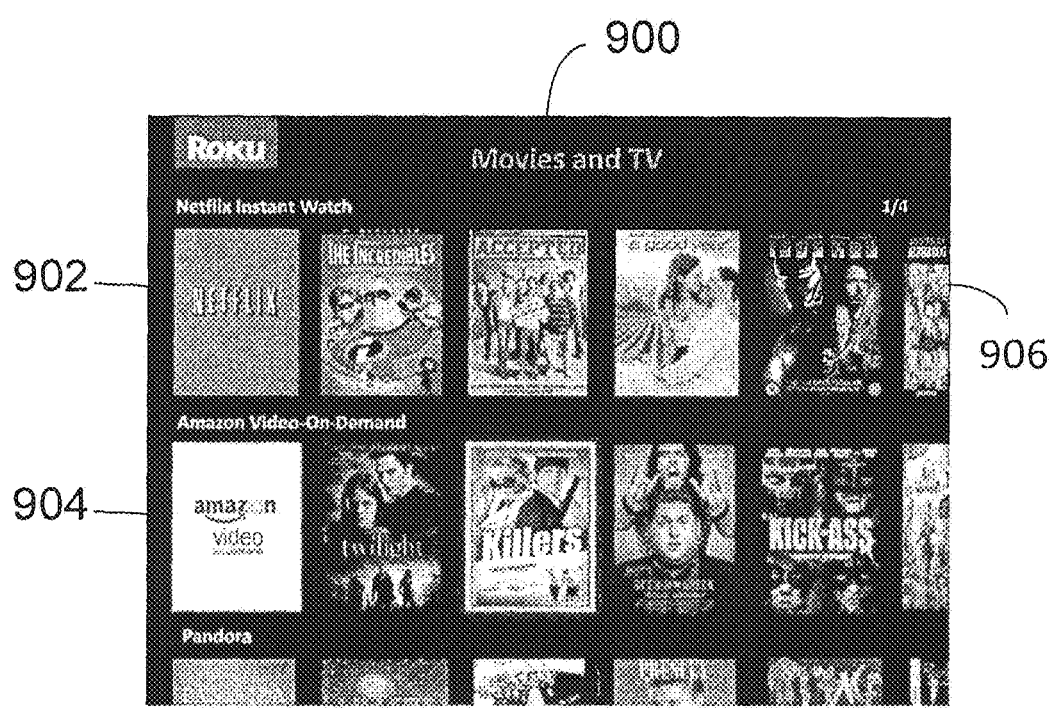
FIG. 9 illustrates aggregated content with poster art presented in accordance with an embodiment of the invention.

FIG. 9 illustrates a non-temporal grid 900 formed in accordance with an embodiment of the invention. The grid 900 includes a first row 902 associated with a first provider (Netflix) and a second row 904 associated with a second provider (Amazon video). Each row has on-demand media content instances with displayed poster artwork 906. Selection of any on-demand media content instance results in the downloading and playing of the selected item.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A content processor, comprising:
a processor; and
a media module executed by the processor and configured to:
receive, based on a first user-defined option, a first display parameter, wherein the first display parameter specifies a first non-temporal format for displaying first aggregated on-demand media content associated with a first provider and organized based on the first provider and a first criteria;
receive, based on a second user-defined option, a second display parameter, wherein the second display parameter specifies a second non-temporal format for displaying second aggregated on-demand media content associated with a second provider and organized based on the second provider and a second criteria, wherein the first criteria is different from the second criteria and the first non-temporal format is different from the second non-temporal format; and
supply, to a media device, an interface that is configured to concurrently display the first provider with the first aggregated on-demand media content and the second provider with the second aggregated on-demand media content, wherein the first aggregated on-demand media content is organized in the first non-temporal format based in part on the first display parameter and the second aggregated on-demand media content is organized in the second non-temporal format based in part on the second display parameter, wherein the interface is further configured to concurrently display a third non-temporal format for displaying any providers that include on-demand media content associated with the first criteria and the third non-temporal format is different from the first non-temporal format and the second non-temporal format.

2. The content processor of claim 1, wherein the first criteria specifies at least one content category associated with the first aggregated on-demand media content, wherein the organized first aggregated on-demand media content includes a plurality of content categories displayed in the first non-temporal format.

3. The content processor of claim 1, wherein the second criteria specifies at least one content instance associated with the second aggregated on-demand media content, wherein the organized second aggregated on-demand media content includes a plurality of content instances displayed in the second non-temporal format.

4. The content processor of claim 3, wherein the at least one content instance includes at least one of visual content, audio content, or video content.

5. The content processor of claim 1, wherein the interface is a non-temporal grid and the first non-temporal format includes displaying the organized first aggregated on-demand media content based in part on the first provider and the first display parameter and wherein the second non-temporal format includes displaying the organized second aggregated on-demand media content based in part on the second provider and the second display parameter.

6. The content processor of claim 5, wherein the non-temporal grid includes the organized first aggregated on-demand content, the organized second aggregated on-demand content, the first provider, the second provider, the first display parameter, and the second display parameter.

7. A computer-implemented method, comprising:
receiving, based on a first user-defined option, a first display parameter, wherein the first display parameter specifies a first non-temporal format for displaying first aggregated on-demand media content associated with a first provider and organized based on the first provider and a first criteria;
receiving, based on a second user-defined option, a second display parameter, wherein the second display parameter specifies a second non-temporal format for displaying second aggregated on-demand media content associated with a second provider and organized based on the second provider and a second criteria, wherein the first criteria is different from the second criteria and the first non-temporal format is different from the second non-temporal format; and
supplying, to a media device, an interface that is configured to concurrently display the first provider with the first aggregated on-demand media content and the second provider with the second aggregated on-demand media content, wherein the first aggregated on-demand media content is organized in the first non-temporal format based in part on the first display parameter and the second aggregated on-demand media content is organized in the second non-temporal format based in part on the second display parameter, wherein the interface is further configured to concurrently display a third non-temporal format for displaying any providers that include on-demand media content associated with the first criteria and the third non-temporal format is different from the first non-temporal format and the second non-temporal format.

8. The computer-implemented method of claim 7, wherein the first criteria specifies at least one content category associated with the first aggregated on-demand media content, wherein the organized first aggregated on-demand media content includes a plurality of content categories displayed in the first non-temporal format.

9. The computer-implemented method of claim 7, wherein the second criteria specifies at least one content instance associated with the second aggregated on-demand media content, wherein the organized second aggregated on-demand media content includes a plurality of content instances displayed in the non-temporal format.

10. The computer-implemented method of claim 9, wherein the at least one content instance includes at least one of visual content, audio content, or video content.

11. The computer-implemented method of claim 7, wherein the interface is a non-temporal grid and the first non-temporal format includes displaying the organized first aggregated on-demand media content based in part on the first provider and the first display parameter, and wherein the second non-temporal format includes displaying the organized second aggregated on-demand media content based in part on the second provider and the second display parameter.

12. The computer-implemented method of claim 11, wherein the non-temporal grid includes the organized first aggregated on-demand content, the organized second aggregated on-demand content, the first provider, the second provider, the first display parameter, and the second display parameter.

13. The computer-implemented method of claim 7, wherein the first and second display parameters are at least one of a user-customization parameter or a default parameter.

14. A media device, comprising:
a processor; and
a presentation module executed by the processor and configured to:
 display a customization template;
 provide, based on a first user-defined option, a first display parameter, wherein the first display parameter specifies a first non-temporal format for displaying first aggregated on-demand media content associated with a first provider and organized based on the first provider and a first criteria;
 provide, based on a second user-defined option, a second display parameter, wherein the second display parameter specifies a second non-temporal format for displaying second aggregated on-demand media content associated with a second provider and organized based on the second provider and a second criteria, wherein the first criteria is different from the second criteria and the first non-temporal format is different from the second non-temporal format;
 receive, from the processor, an interface comprising the organized first and second aggregated on-demand media content; and
 display the interface, wherein the first interface is configured to concurrently display the first provider with the organized first aggregated on-demand media content in the first non-temporal format and the second provider with the organized second aggregated on-demand media content in the second non-temporal format, wherein the interface is further configured to concurrently display a third non-temporal format for displaying any providers that include on-demand media content associated with the first criteria and the third non-temporal format is different from the first non-temporal format and the second non-temporal format.

15. The media device of claim 14, wherein the first criteria specifies at least one content category associated with the first aggregated on-demand media content, wherein the organized first aggregated on-demand media content includes a plurality of content categories displayed in the first non-temporal format.

16. The media device of claim 14, wherein the second criteria specifies at least one content instance associated with the second aggregated on-demand media content, wherein the organized second aggregated on-demand media content includes a plurality of content instances displayed in the second non-temporal format.

17. The media device of claim 16, wherein the at least one content instance includes at least one of visual content, audio content, or video content.

18. The media device of claim 14, wherein the interface is a non-temporal grid and the first non-temporal format includes displaying the organized first aggregated on-demand media content based in part on the first provider and the first display parameter, wherein the second non-temporal format includes displaying the organized second aggregated on-demand media content based in part on the second provider and the second display parameter.

19. The media device of claim 18, wherein the non-temporal grid includes the organized first aggregated on-demand content, the organized second aggregated on-demand content, the first provider, the second provider, the first display parameter, and the second display parameter.

20. The content processor of claim 1, wherein the first display parameter is based on preexisting criteria and user-defined customization parameters that are inputted via the interface.

21. A non-transitory, tangible computer-readable medium having instructions stored thereon that, when executed by at least one computing device, cause the at least one computing device to perform operations comprising:
 receiving, based on a first user-defined option, a first display parameter, wherein the first display parameter specifies a first non-temporal format for displaying first aggregated on-demand media content associated with a first provider and organized based on the first provider and a first criteria;
 receiving, based on a second user-defined option, a second display parameter, wherein the second display parameter specifies a second non-temporal format for displaying second aggregated on-demand media content associated with a second provider and organized based on the second provider and a second criteria, wherein the first criteria is different from the second criteria and the first non-temporal format is different from the second non-temporal format; and
 supplying, to a media device, an interface that is configured to concurrently display the first provider with the first aggregated on-demand media content and the second provider with the second aggregated on-demand media content, wherein the first aggregated on-demand media content is organized in the first non-temporal format based in part on the first display parameter and the second aggregated on-demand media content is organized in the second non-temporal format based in part on the second display parameter, wherein the interface is further configured to concurrently display a third non-temporal format for displaying any providers that include on-demand media content associated with the first criteria and the third non-temporal format is different from the first non-temporal format and the second non-temporal format.

22. The non-transitory, tangible computer-readable medium of claim 21, wherein the first criteria specifies at least one content category associated with the first aggregated on-demand media content, wherein the organized first aggregated on-demand media content includes a plurality of content categories displayed in the first non-temporal format.

23. A non-transitory, tangible computer-readable medium having instructions stored thereon that, when executed by at least one computing device, cause the at least one computing device to perform operations comprising:
 displaying a customization template;
 providing, based on a first user-defined option, a first display parameter, wherein the first display parameter specifies a first non-temporal format for displaying first aggregated on-demand media content associated with a first provider and organized based on the first provider and a first criteria;
 providing, based on a second user-defined option, a second display parameter, wherein the second display parameter specifies a second non-temporal format for displaying second aggregated on-demand media content associated with a second provider and organized based on the second provider and a second criteria, wherein the first criteria is different from the second criteria and the first non-temporal format is different from the second non-temporal format;

receiving, from the processor, an interface comprising the organized first and second aggregated on-demand media content; and displaying the interface, wherein the first interface is configured to concurrently display the first provider with the organized first aggregated on-demand media content in the first non-temporal format and the second provider with the organized second aggregated on-demand media content in the second non-temporal format, wherein the interface is further configured to concurrently display a third non-temporal format for displaying any providers that include on-demand media content associated with the first criteria and the third non-temporal format is different from the first non-temporal format and the second non-temporal format.

24. The non-transitory, tangible computer-readable medium of claim 23, wherein the first criteria specifies at least one content category associated with the first aggregated on-demand media content, wherein the organized first aggregated on-demand media content includes a plurality of content categories displayed in the first non-temporal format.

* * * * *